United States Patent [19]
Farnand et al.

[11] 3,975,194
[45] Aug. 17, 1976

[54] FORMATION OF HOLLOW SPHERICAL ARTICLES

[75] Inventors: Joseph Redmond Farnand; Ira Edwin Puddington, both of Ottawa, Canada

[73] Assignee: Canadian Patents and Development Limited, Ottawa, Canada

[22] Filed: Mar. 4, 1974

[21] Appl. No.: 447,730

[52] U.S. Cl. .................................. 75/222; 65/18; 106/41; 252/463; 252/466 PT; 264/12; 264/13; 264/44; 264/49; 264/344

[51] Int. Cl.² ...................... B22F 3/16; B22F 9/00; B29D 27/00

[58] Field of Search .................. 264/49, 51, 12–14, 264/344, 44, DIG. 72, 63; 75/222; 106/41; 252/463, 466 PT; 65/18

[56] References Cited
UNITED STATES PATENTS

| | | | |
|---|---|---|---|
| 1,742,515 | 1/1930 | Mandell | 264/49 |
| 2,797,201 | 6/1957 | Veatch et al. | 264/54 |
| 3,234,307 | 2/1966 | Tuttle | 264/14 |
| 3,528,809 | 9/1970 | Farnand et al. | 75/222 |
| 3,540,884 | 11/1970 | Horbury | 75/222 |
| 3,651,182 | 3/1972 | Rosenthal | 264/54 |
| 3,739,049 | 6/1973 | Honjo | 264/13 |
| 3,753,932 | 8/1973 | Jenkins | 260/18 EP |
| 3,812,224 | 5/1974 | Smith et al. | 264/49 |
| 3,849,528 | 11/1974 | Smith | 264/49 |
| 3,859,405 | 1/1975 | Horton | 264/49 |

*Primary Examiner*—Philip Anderson
*Attorney, Agent, or Firm*—Alan A. Thomson

[57] ABSTRACT

Hollow articles, in particular microballoons, hollow fibers and other shapes, are prepared by dispersing or dissolving a soluble film-forming solid in a core solvent which is normally solid but transformable slowly to gas, shaping the blend while molten, cooling to solidify and slowly removing the solid core material as a gas. The film-forming solid migrates to form a shell having the original core shape and a non-uniform cross-section of an outer skin and an inner sponge lining.

13 Claims, No Drawings

FORMATION OF HOLLOW SPHERICAL ARTICLES

This invention is directed to the preparation of hollow articles, particularly small spheres or other shapes of a film-forming material having non-uniform shell cross-section. The preparation process includes mixing a normally solid core solvent transformable directly into gas with a soluble film-forming solid, shaping the mixture while molten, slowly removing the solid core material as a gas with migration of the film-forming solid, and recovering the hollow articles produced. Unexpectedly these hollow articles have been found to have an outer dense skin and an inner sponge lining.

Previously hollow articles of small size e.g. microballoons, have been made by spray drying or atomizing solutions or emulsions containing film-forming materials plus blowing agents or gas-forming agents. The blowing agents decompose and form small balloons as the solvent is removed at elevated temperatures. The size and shape are rather difficult to control with this technique. Microcapsules have been prepared e.g. by dissolving film-forming polymer in a solvent, adding a core substance, forming droplets of this dispersion in a liquid medium, and evaporating the solvent plus liquid medium. Structural solids have been mixed with volatile or sublimable core material and the core removed to leave porous but not hollow articles. Hollow articles of inorganic solids such as metals and metal oxides have been formed by coating a core removable as gas with the solid particles, slowly removing the core as gas, and consolidating the coating to give a hollow article (U.S. Pat. No. 3,528,809 Sept. 15, 1970, Farnand and Puddington).

Recently microporous open-celled cellular polymeric structures have been prepared using certain chlorofluorocarbon solvents. Plastic malleable solidified solutions were obtained, shaped and the solidified solvent vaporized to leave the microporous, but not hollow, structures (U.S. Pat. No. 3,753,932 Aug. 21, 1973, Jenkins).

In accordance with the present invention, hollow articles, particularly microballoons, are prepared by:
 a. uniformly dispersing a soluble film-forming solid material into a core solvent material which is a solid transformable slowly into gas,
 b. shaping the mixture comprising said two materials while the solvent is molten,
 c. cooling to solidify as a shaped blend,
 d. slowly transforming the solid core material into a gas and removing the gas from the shaped blend without deformation thereof (causing migration of the film-forming material to the surface),
 and e. recovering hollow articles having the form of the shaped mixture and a wall cross-section consisting of an outer skin and an inner sponge lining.

Unexpectedly it has been found that (i) the resulting articles of film-forming material are hollow and not porous throughout, and (ii) the wall cross-section of the hollow article is non-uniform i.e. the wall is composed of a dense outer skin and an inner sponge lining.

The thickness of the shell wall increases directly with the amount of film-forming material (plus any other solids) dispersed in the core and a considerable range of thicknesses has been found possible. Wall thicknesses of up to about 10–15% of the diameter have been prepared. In order to have reasonable strength, the wall thickness should usually be at least about 3 microns. Balloons have been prepared of about 10–10,000 microns diameter.

The amount of film-forming material in the core should be sufficient to form a self-supporting shell, usually at least about 0.5% by weight of the core material. As the amount of film-forming material increases, the thickness of the shell is increased with the upper limit being the inability of the film-forming material to migrate (as a separate phase) in the solidified core, leaving a non-hollow article. The upper limit is not sharply definable and depends on the individual system; preferably it should not substantially exceed the solubility limit at shaping temperatures. Not more than about 20% of the film-forming material is usually operative, with a preferred range being from 2–10%.

The film-forming material can be any polymeric coating, thermoplastic, or rubbery material, (usually a synthetic organic polymer), thermosetting resin or sulphur. This film-forming material should be highly compatible with the core material and readily dispersed or dissolved therein to form a substantially single phase mixture. Suitable film-forming materials include polyolefins (e.g. polyethylene, polypropylene), polystyrene, polyvinylchloride, polyvinylidene chloride, polyvinyl acetate, polymethyl methacrylate, polyamides, butadiene polymer and copolymer rubbers, polychloroprene, polysulfide rubbers, solid petroleum fractions such as paraffin wax and pitch, epoxy resins, phenolic resins, sulfur, and mixtures thereof. Thermoplastic materials which readily blend with the core material are usually preferred. The sulfur may be in a polymerized form.

The core material must be slowly transformable to gas usually by sublimation or depolymerization, and must have good solvent action on the film-forming material. Suitable core materials include naphthalene, anthracene, paraformaldehyde, polyoxymethylenes, iodine, phenol, camphor, sym.-trioxane and paradichlorobenzene. Naphthalene is one preferred core material since it can be easily shaped into cores (particularly small spheres), has a suitable sublimation pressure at room temperature, and has a strong solvent action on many of the film-forming materials. Paradichlorobenzene can be worked at a lower temperature then naphthalene and is desirable in some systems. Some of these core materials act as plasticizers in some of the film-forming polymers, indicating a desirable combination. The plasticized polymer is in effect a single phase solid solution.

The film-forming material can be dispersed in the core by various techniques. The core material can be melted and the film-forming material blended in. A mutual solvent of low boiling point can be used to aid the formation of the mixture and the solvent then evaporated. Powders can be blended and the temperature raised to form a uniform mixture.

The blend of core and film-forming materials is shaped into the desired form for the hollow article. Small spheres can be formed by atomizing, spray-drying, emulsification at elevated temperatures in non-solvents and cooling, and by other molding techniques such as casting. Extruded portions of small cross-section can be used to form the substantially spherical hollow articles.

The core material is then slowly removed as gas causing the film-forming material to migrate to the surface. Many of the core materials will sublime at room temperature at a suitable rate. With many thermoplastic material-sublimable core systems, the core removal and migration of thermosplastic material can be accelerated at moderately elevated temperatures without detriment. Core removal should normally not be accelerated to less than about 0.5 hour as there is the danger the shell will be warped or distorted and the interior may not be completely hollow. As the core sublimes, the initial shape does not shrink as might be expected.

Unexpectedly it was found that particulate solids or flakes could be dispersed in the core material while liquid, along with the film-forming material, and would migrate with the film-forming material to form part of the shell. Amounts up to about 60% by weight of the core may be used (preferably about 10–50%). Thus the core material will constitute at least about 62.5% by weight of the total mixture. Suitable particulates include pigments, metal flakes or powders, small mica platelets, clay, silica, alumina etc. Where the particulates are sinterable or fusible, the film-forming material can be removed and the solid particles consolidated by heating. Small spheres of various precious metals (e.g. gold, silver, platinum) which are of interest as jewelry, and of carbon, glass, ceramics, refractories, cermets etc. can be prepared in this manner. Hollow catalyst beads such as of alumina or platinum + alumina can also be formed.

The porous structure of the shell can be controlled to some extent by adjusting one or more of (a) the amount of film-forming material and the amount and geometry of other solids in the core, (b) the rate of core removal, and (c) the properties of the film-forming polymer. The shell structure of outer skin and inner sponge lining is very strong. For a given weight of material and size, this type of shell is believed to be the strongest structure obtainable.

The following Examples are illustrative. All parts are by weight.

EXAMPLE 1

An 8% solution of polyethylene in molten naphthalene was atomized using a commercial paint sprayer. The atomized spheres were collected and the naphthalene slowly sublimed at about 50°C yielding hollow balloons of polyethylene. The inside of the polyethylene shell was like a porous lining while the outside was like a skin. Most of the balloons were about 50 micron diameter and 5–10 micron wall thickness. A narrow spectrum of sizes was obtained which was easily segregated by screening, and off-sizes reworked if desired.

In other experiments where polyethylene was used, microballoons 25 microns in diameter with 5 micron walls were produced at the small end of the scale, and balloons 500 micron diameter with wall thickness about 25 microns at the upper end of the scale. The inner layers of the shells produced were of porous structure (linings).

EXAMPLE 2

About 50 parts of a 12% solution of polyethylene in naphthalene was added to a mixer containing about 200 parts of water at 90°–95°C. After 3 minutes mixing, the mixture was decanted into 500 parts of vigorously agitated cold water. The resulting spheres were recovered from the water, and the naphthalene allowed to sublime at 50°C. The balloons produced were found to have bulk density of 0.0746 g/cc with an average diameter of 25 microns and a wall of about 5 microns.

With a more rapid stirring action in the mixer, considerably smaller microballoons were produced.

Several further experiments were carried out in a similar manner with the polyethylene varied from 3 to 20%, giving wall thicknesses directly proportional to the amount used. The shell wall cross-sections were porous in the inner layers.

EXAMPLE 3

A 6% solution of polyethylene in naphthalene was placed in a spray gun system and the solution maintained at about 120°C by an external electric heater. The spray nozzle was kept hot by a hot air blast. The hot solution was sprayed with about 15 p.s.i. air into a spray of cold water to solidify the spray particles. The solidified particles were collected in a large pan of water. The naphthalene component was allowed to sublime at about 50°C in an air-circulating oven. Photographs were taken during sublimation and no appreciable shrinkage of the shells was observed. The size of the resulting microballoons was controlled by adjusting the spray nozzle to obtain from sub-micron to several millimeters diameter particles.

This technique was also used for the following materials in naphthalene: polyvinyl acetate, polymethyl methacrylate, polystyrene and polypropylene. The inner layers of the shells were sponge-like.

EXAMPLE 4

A hot solution of 10% polyvinyl chloride in naphthalene was extruded just below the surface of a column of water maintained within about 80°–98°C in the upper section and within 30°–40°C in the lower section. The spheres solidified as they went through the cold zone. Balls over a wide size range were made in this manner. The size decreased inversely as the rate of extrusion. The naphthalene was sublimed to give hollow spheres as before.

EXAMPLE 5

Experiments where from 1–20% of various naphthalene-soluble thermoplastic polymers were dissolved in naphthalene yielded microballoons of surprisingly good quality. Polymers used included polyvinyl acetate, polyvinyl chloride, polyvinylidene chloride, polystyrene, polymethyl methacrylate, and various rubbers (polybutadiene, polychloroprene, and polysulfides). The naphthalene-polymer system was emulsified in hot water at about 90°C and quickly chilled to about 30°C. The naphthalene as allowed to evaporate from the resulting spheres over about two days at slightly above room temperature, yielding the microballoons having a dense outer skin and a more porous lining.

EXAMPLE 6

Polyamide microballoons were made by dissolving 5–10% of the polyamides in anhydrous phenol and atomizing the solution. The atomized particles were collected and the phenol removed by slow sublimation. Good quality microballoons were formed having a dense outer skin and an inner more porous lining.

EXAMPLE 7

Hollow spheres were formed from elemental sulphur (5–20%) in naphthalene by the techniques of Examples 1, 2 and 5. Good quality hollow spheres were formed. Sulphurpolymer combinations soluble in the core material (naphthalene) were similarly formed into hollow spheres e.g. 10% polyvinylidene chloride + 90% sulphur, 23% polyvinyl acetate + 77% sulphur, and 30% polyvinyl chloride + 70% sulphur. The chlorinated polymers would impart fire-retardant properties to the system. Various other soluble fire-retarding or plasticizing agents could be similarly incorporated.

EXAMPLE 8

Ten parts of naphthalene and 1 part of a mixture of 100 parts polysulfide rubber (LP33) + 5 parts $MnO_2$ + 4 parts trinitrobenzene (accelerator) were mixed together with 30 parts of water. This mixture was heated to 90°C and shaken to form an emulsion which was then dumped into vigorously agitated ice water. The resulting particles were recovered and the naphthalene allowed to sublime in sunlight. Small balloons in a size range of 0.5 to 1.5 mm. diameter were formed. The procedure was repeated with a different sulfide rubber (LP2) diluted with trichloroethylene giving balloons in the same size range.

EXAMPLE 9

Six % of polyethylene was dissolved in p-dichlorobenzene at about 60°C. From this solution maintained at 60°–70°C, spherical particles about 40 microns in diameter were made with a spray gun. Using another portion of the same solution, spheres 3 to 8 mm. diameter were made by injecting drops of the solution with a syringe pump and with a 20 cc. syringe into a column of 20% water and 80% glycerine. The top of this 2 foot high column was maintained at about 60°C, and the bottom about 5°C. Using still another portion of the same solution, spheres 4.5 mm. diameter were cast in a multiple cavity split brass mould. In all three cases, the p-dichlorobenzene was either sublimed under vacuum at room temperature or sublimed in an air circulating oven at about 40°C over a period of about 24 hours. Hollow spheres resulted, having substantially the same diameter as the initial spheres.

In a similar manner, hollow balls were made by using p-dichlorobenzene as a core solvent with the following materials: polyvinylidine chloride, polystyrene, polymethylmethacrylate, and polyvinyl acetate.

EXAMPLE 10

Ten parts of a 10% solution of paraffin wax in naphthalene were added to 40 parts of water, the mixture heated to 90°C. and shaken to form an emulsion which was then dumped into vigorously agitated ice water. The resulting particles were recovered and the naphthalene was sublimed at 50°C. Hollow balls 1 to 2 mm. in diameter were formed.

EXAMPLE 11

An aromatic pitch (softening point of 300°C) was dissolved in para-dichlorobenzene at 60°C in the amount of 10%.

a. From a portion of the hot solution spherical particles of about 50 microns were made with a spray gun. The para-dichlorobenzene was sublimed at 35°C leaving hollow pitch balls of this size.

b. Using another portion of the same solution, spheres 1 to 6 mm. diameter were made by injecting drops of the hot solution from a syringe into a column of 20% water and 80% glycerine. The top of this 2-foot-high column was maintained at 60°C and the bottom at 5°C. The paradichlorobenzene was sublimed at 35°C leaving hollow pitch balls of the same size as the initial drops.

EXAMPLE 12

One hundred parts of liquid epoxy resin plus 12 parts of a polyamide were mixed together to form a homogenous mix.

Ten parts of this mixture were added to 90 parts of paradichlorobenzene at 60°C and mixed again. The blend was then transferred to a syringe and spheres of about 4 mm. diameter were made by injecting drops of the mixture by means of a syringe pump into a one foot column of liquid nitrogen. The spheres were recovered and the para-dichlorobenzene was sublimed out slowly over 24 hours at about 30°C. The epoxy amide cured while sublimation was taking place, leaving hollow epoxy-polyamide balls of about 4 mm. diameter.

EXAMPLE 13

Thirteen parts of a commercial liquid phenolic resin containing about 25% solvent, were dissolved in 87 parts of sym.-trioxane at 70°C. A portion of the hot liquid was used to make spheres in a multiple cavity split mold. With another portion of the same solution, spheres 2 to 6 mm. in diameter were made by injecting drops of the hot solution from a syringe into a 1-foot column of liquid nitrogen.

After recovering the spheres in both cases, they were allowed to stand several hours at room temperature to partially cure the resin. The sym-trioxane was subsequently sublimed at about 40°–50°C. Hollow balls resulted of the same size as the initial drops.

The shells of the hollow balls from the above Examples had the characteristic outer skin + lining structure, and were very strong. Many of the film-forming materials have some resiliency and would deform under load but return to the original shape when the load was removed.

The following Examples illustrate the further incorporation of sinterable or fusible solids in the system, with the organic material usually being removed by heating to leave an inorganic hollow article.

EXAMPLE 14

To twenty parts of a solution of 3% polyvinyl chloride in naphthalene was added 6 parts of −325 mesh sand. After stirring thoroughly the mixture was extruded as drops and these dropped through a column of water 16 inches in height with the top portion maintained at 90°C and the bottom portion at 40°C. The resulting balls were recovered and the naphthalene sublimed at 50°C. The balloons obtained were then heated to 1550°C to remove the polymer and sinter the siliceous sand giving strong hollow glass-like spheres of good quality.

Hollow spheres were made from ceramic clay, aluminum, and silver in the same way.

Instead of extruding drops and passing through a water column, the mixture was sprayed into a rotating pan of ice water in which the water was well agitated. Good balls were obtained and processed into hollow spheres as before.

EXAMPLE 15

A mixture of 75% naphthalene, 5% polyvinyl acetate (M.W. about 100,00) and 20% silica flour was cast into spheres by injecting drops of the molten mixture into the top of a water column several feet long. The top of the column was maintained at 90°C by external heating, and the bottom at about 5°C by external cooling. The recovered spheres were warmed to sublime the naphthalene, and further heated to remove the polymer and to sinter the silica. Hollow spheres of silica of from 2 to 6 mm. diameter were obtained, with the size and shape being maintained from the original solid spheres. The addition of sodium carbonate to the silica gave a reduced sintering temperature. Hollow glass spheres were obtained from ground glass in a similar manner.

EXAMPLE 16

Spheres of about 7.5 mm. diameter were cast from a mixture of 5% aluminum pigment in a solution of 3% polyvinyl acetate in naphthalene. The core sublimed at 50°C with very little shrinkage leaving a shell composed of a skin with an inner porous lining. The density was about 0.4 g/cc. After ignition at 600°C, reasonably strong hollow Al spheres of density 0.3 g/cc. were obtained.

EXAMPLE 17

Seven parts of −325 mesh silver powder were dispersed in 15 parts of the 3% solution of polyvinyl acetate in naphthalene. The dispersion was formed into spheres of about 10 mm. diameter, and the naphthalene sublimed at about 50°C. The polymer was removed by heating in air at about 500°C and the hollow silver spheres sintered at about 850°C. On sectioning the final hollow spheres, it was observed that the outside surface was a coherent film of silver, with a slightly thicker layer of porous silver as an inner lining.

Hollow spheres were made from the same concentration of pottery clay in the same way. Sintering at 1200°C produced hollow ceramic spheres.

EXAMPLE 18

Similarly to Example 17 except that copper was substituted for the silver, copper balloons being formed. In this case it was necessary to post heat treat in a reducing atmosphere to form the copper balloons as the polymer was removed by oxidation with concurrent formation of copper oxide. If the polymer was removed by depolymerization or volatilization, oxidation could be avoided.

EXAMPLE 19

In 15 parts of a 3% solution of polymethylmethacrylate in p-dichlorobenzene, 3.5 parts of −325 mesh silver powder and 3.5 parts of silver flakes were dispersed. This dispersion was cast into spheres approximately 5 mm. in diameter. The paradichlorobenzene was sublimed at about 40°C, the polymethylmethacrylate depolymerized by heating to about 300°C in air, and the resulting silver hollow spheres sintered at 830°C.

A variation of the above procedure was carried out by giving the sublimed hollow balls a coat of an acrylic emulsion adhesive and causing them to pick up a coating of silver flakes. They were then depolymerized and sintered in the above manner. This procedure produced hollow balls with thicker and slightly smoother surfaces.

The sintered hollow spheres of Examples 14 −19 retained the shell structure of outer skin and inner sponge lining. The sintered metal spheres can be subject to metallurgical procedures such as working e.g. by rolling or lightly hammering or impacting to polish, densify and/or work harden the outer layer. The glass and metal spheres were very strong.

The microballoons formed from vinylic polymers, particularly polyolefins, may be dispersed in lubricants to form a very effective grease. Polyethylene or polypropylene spheres of about 10 to 100 microns diameter would be particularly suitable. Such spheres are able to flex under stress and retain their integrity giving a desirable yield value to the grease.

EXAMPLE 20

The hollow spheres of polyethylene (as from Example 1) of 50 micron diameter, were dispersed at room temperature in a petroleum oil of 3000 S.U.S. viscosity, the polyethylene being in an amount of 6% wt. A very satisfactory grease resulted.

We claim:
1. A method of forming hollow substantially spherical particles or balls of non-uniform wall cross-section comprising:
   a. uniformly dispersing a soluble film-forming solid into a core solvent material which is a solid transformable directly into gas while the solvent material is in liquid form, the film-forming solid being present in a migratable amount of from about 0.5 to about 20% by wt. of the core solvent,
   b. shaping the mixture comprising said two materials in at least about 62.5% of the total mixture, into substantially spherical particles or balls of a diameter not more than about 10mm. while the solvent is molten,
   c. rapidly cooling said particles or balls to solidify the same,
   d. slowly transforming the solid core material directly into a gas and removing the gas from said particles or balls without deformation thereof to cause migration of the film-forming material to the surface, the time for core removal being not less than about 0.5 hour, and sufficient to allow the migration to occur, and
   e. recovering hollow substantially spherical particles or balls of said film-forming solid having a wall cross-section consisting of an outer skin and an inner sponge lining, the wall thickness being less than about 15% of the diameter.
2. The method of claim 1 wherein the film-forming solid is an organic polymer.
3. The method of claim 1 wherein the core material is sublimable at temperatures below about 50°C.
4. The method of claim 1 wherein an inorganic solid material in the form of small flakes or particles is uniformly incorporated in said mixture in amounts up to about 60% by weight of the core.
5. The method of claim 4 wherein the inorganic solid particulate material is selected from pigments metal flakes or powders, mica platelets, clay, sand, glass, silica or alumina.
6. The method of claim 5 wherein the inorganic solid particulate material is sinterable or fuseable and the particles or balls or the film-forming material are further heated to remove the film-forming material and are then sintered or fused to form inorganic particles or balls.
7. The method of claim 2 wherein the polymer is a thermoplastic addition polymer.
8. The method of claim 2 wherein the polymer is a thermosetting resin.

9. The method of claim 1 wherein the film-forming solid is a normally solid petroleum fraction.

10. The method of claim 1 wherein the film-forming solid is sulfur or a polymerized form thereof.

11. The method of claim 1 wherein the film-forming solid is present in an amount up to the solubility limit at the shaping temperature, in the core material.

12. The method of claim 1 wherein the core material is selected from the group consisting of naphthalene, paradichlorobenzene, phenol and sym.-trioxane.

13. The method of claim 2 wherein the core material is a plasticizer for the polymer.

* * * * *